United States Patent [19]

Nollez et al.

[11] 4,436,051

[45] Mar. 13, 1984

[54] HOISTING AND LOWERING MECHANISM FOR A ROTATABLE MAST

[75] Inventors: Jacques Nollez, Paris; Jacques Ragain, Domont; Marc Prevost, Paris, all of France

[73] Assignee: Societe d'Optique, Precision Electronique et Mechanique, Sopelem, Levallois-Perret, France

[21] Appl. No.: 344,271

[22] Filed: Jan. 28, 1982

[30] Foreign Application Priority Data

Feb. 4, 1981 [FR] France ............................ 81 02098

[51] Int. Cl.³ ............................................. B63G 8/38
[52] U.S. Cl. .................................................. 114/340
[58] Field of Search ................ 114/339, 340; 350/302; 254/93 R; 92/110, 111, 52, 117 R, 117 A

[56] References Cited

U.S. PATENT DOCUMENTS

| | | | |
|---|---|---|---|
| 749,755 | 1/1904 | Spear | 114/340 |
| 1,313,534 | 8/1919 | Hoffman | 114/340 |
| 2,503,748 | 4/1950 | Kollmorgen | 254/93 R |
| 2,505,009 | 4/1950 | Schroeder | 92/52 |
| 3,381,590 | 5/1968 | Rosenberg et al. | 92/111 |

FOREIGN PATENT DOCUMENTS 451519  4/1913  France ................... 114/340

Primary Examiner—Trygve M. Blix
Assistant Examiner—Rodney Corl
Attorney, Agent, or Firm—Pollock, Vande Sande & Priddy

[57] ABSTRACT

Hoisting and lowering mechanism for a mast capable of axial and pivoting movement, comprising a jack housed at the lower part of the mast and fast to a suspension with respect to which the mast can pivot, the end of the rod of the jack being coupled through an anchoring point to the fixed parts situated beneath the mast. The invention is useful for the optronic mast or the periscopic surveillance antenna of a submarine.

4 Claims, 1 Drawing Figure

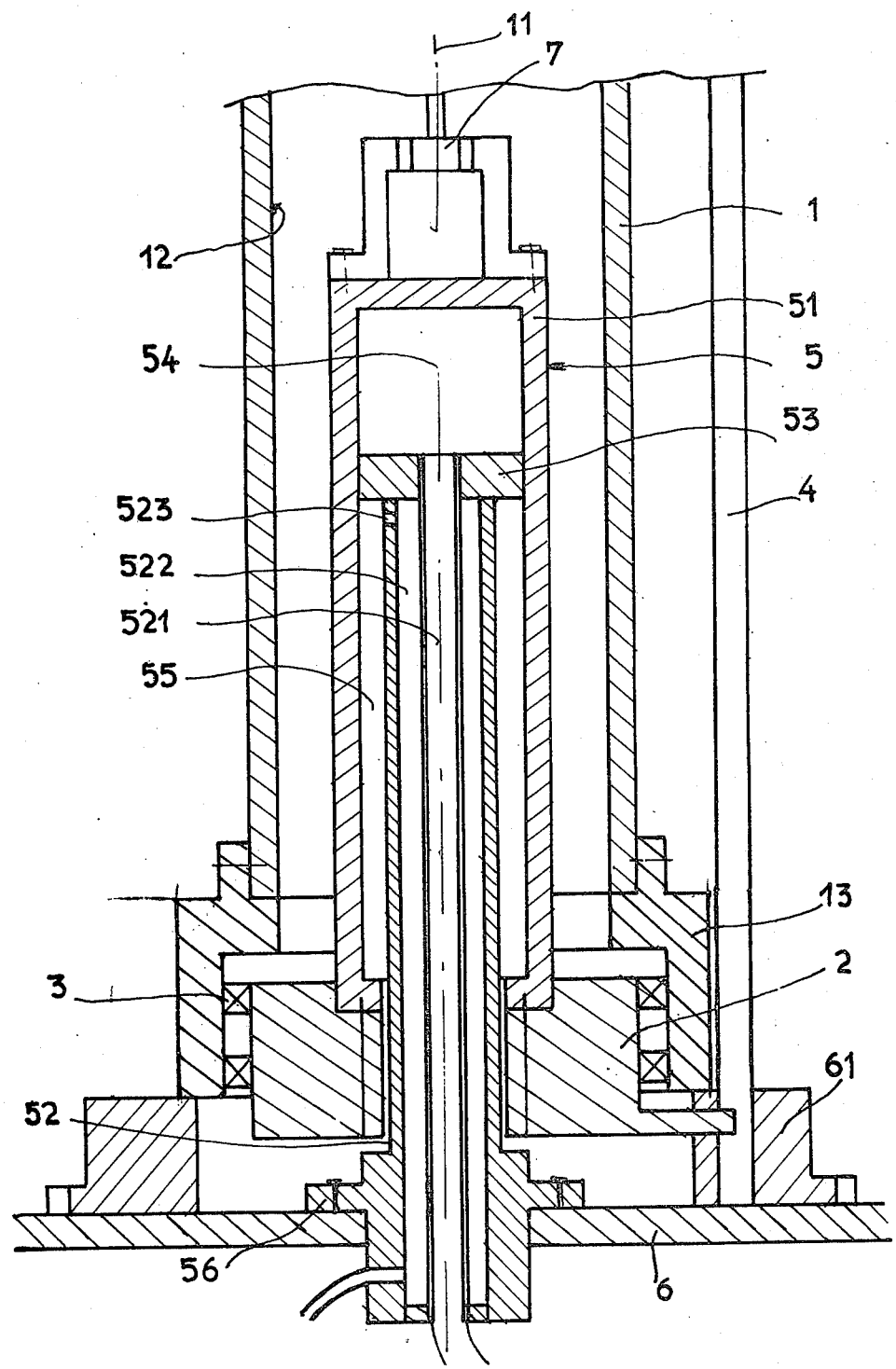

HOISTING AND LOWERING MECHANISM FOR A ROTATABLE MAST

FIELD OF THE INVENTION

The present invention relates to a hoisting and lowering mechanism for a mast movable axially and pivotable in rotation about its axis.

The invention applies particularly, in a submarine, to an optronic (electro-optical) mast bearing a camera or a periscopic antenna for surveillance by radar.

DESCRIPTION OF THE PRIOR ART

A hollow mast or tube, such as an optronic mast or a periscopic antenna, is guided by bearings so as to slide vertically and to pivot in rotation about its axis. At its lower part is mounted, through a roller bearing, a suspension, immobilized in rotation, with respect to which it can pivot about its vertical axis. The axial movement of the mast is provided by one or several jacks mounted on the outside and supported on the fixed parts and coupled to the suspension. The jacks can be mounted in two different ways. They can be locked to the upper portion of the suspension which they then pull during hoisting and push during lowering. They can also be mounted beneath the suspension which they then push during hoisting and pull during lowering. Due to the fact that each jack must provide at least the desired length of the travel and is on the outside, these known mechanisms have considerable bulk. In the case where the jack is mounted beneath the suspension, it is housed in the cross-member of the hull of the submarine.

In prior art constructions, the hoisting and lowering mechanism comprises a reeving system with pulleys operated by jacks, but with such a mechanism the descent of the mast is simply assured by gravity. An electrical rotary joint permits the passage of possible electronic data.

It is an object of the present invention to overcome the drawbacks of known mechanisms and provide a vertical hoisting and lowering mechanism for a rotary mast, double-acting, procuring reduced bulk and mountable above the thick hull of a submarine so as to avoid traversing this hull by movable parts.

SUMMARY OF THE INVENTION

According to the invention, there is provided a mechanism enabling the hoisting and lowering of a submarine mast movable axially and in rotation and provided at its lower end with a suspension to which it is connected vertically and with respect to which it can pivot, and it includes a jack which moves said suspension, the jack being housed rod downwards in the mast at the lower part so that the cylinder is fast to the suspension and so that the lower end of the rod is coupled through an anchoring point to the upper part of the thick hull.

According to a feature of the invention, the rod of the jack comprises oil supply passages to the upper chamber and the lower chamber of the jack.

BRIEF DESCRIPTION OF THE DRAWING

The invention will now be described in more detail with reference to a preferred embodiment given by way of example and shown in the accompanying drawing.

The single FIGURE of the drawing is a section through the vertical axis of the mast of the mechanism according to the invention.

DESCRIPTION OF A PREFERRED EMBODIMENT

The mast or tube 1 serving as an optronic mast or periscopic antenna is mounted in a submarine. This mast is guided vertically along its longitudinal axis 11 by guide bearings in a manner known per se. These guide bearings enable sliding and pivoting of the mast along its vertical axis 11 and assure fluid-tightness. A suspension 2 is mounted at the lower part of the mast and beneath the bearings, through a roller bearing 3 which permits the relative rotation of the mast and of the suspension while assuring the vertical connection of this suspension with respect to the mast. The suspension 2 can slide vertically above the thick hull 6. A vertical rail 4 immobilizes this suspension in rotation. The mast is rotated about its longitudinal axis 11 by a motor (not shown).

A jack 5 is mounted rod downwards by connecting the suspension 2 to the thick hull 6 situated beneath and so as to be situated above this hull. The cylinder 51 of the jack is housed in the bore 12 of the mast 1 by being mounted so that the bottom is above and the rod side is below. This cylinder is mounted above the suspension 2 and is fast thereto. The rod 52 of the jack which is fast through its upper end to the piston 53 passes through the suspension 2. It is fixed, its lower end being attached beneath the mast by a fixed anchoring connection 56 or by an articulation at the upper part of the thick hull 6, so that the jack is mounted, rod downwards, above and outside the thick hull. Preferably, the jack is mounted coaxially with the mast.

In the rod 52 are arranged two supply passages for oil 521 and 522 supplying oil respectively to the upper chamber 54 housed between the piston 53 and the bottom of the cylinder and the lower chamber 55 situated beneath the piston 53. The supply passage 521 of the upper chamber 54 is formed by an axial tube which opens through the piston 53 and which is housed in a bore of the rod. The annular space formed in this bore around the axial tube constitutes the passage 522 which opens into the chamber 55 through openings 523 formed at the upper part of the rod.

The passages 521 and 522 pass through the thick hull 6 at the level of the thick hull 6 so that the entrances are situated beneath the inside of said thick hull, which permits good safety and easy access.

The upper part of the jack cylinder movable in translation bears through a support part a rotary joint 7 which permits electrical connection with the upper part of the mast.

The cable descent is effected then along this cylinder, in the annular space comprised between the cylinder and the inner bore of the mast.

The mast is provided at its lower end with a seating part 13. This seating part 13 can rest on a buffer 61 fast to a fixed part so as to avoid causing all the weight to be supported on the jack which would risk its collapse.

The operation of the mechanism will now be explained.

When high pressure is sent into the chamber 54, the cylinder 51 is lifted and hoists the mast. When the lower chamber 55 is subjected to high pressure and the upper chamber 54 is subjected to low pressure, the cylinder 51 descends and lowers the mast. The mechanism has a double action operation.

We claim:

1. Mechanism for hoisting and lowering a rotatable mast for a submarine having a thick hull (6), said mast being guided along its longitudinal axis with respect to said submarine, comprising
   (a) a suspension (2) associated with means (3) assuring the vertical connection of said suspension to the lower part of said mast while permitting relative rotation of said suspension and said mast; and
   (b) a jack (5) housed rod downward in said mast so that its cylinder (51) is fast to said suspension (2) and so that the lower end of its rod (52) is coupled through an anchoring point (56) to the upper part of said thick hull (6).

2. Mechanism according to claim 1, wherein said rod (52) of said jack comprises supply passages for oil to the upper chamber and the lower chamber of said jack, so that the entrances to said passages are situated beneath said thick hull.

3. Mechanism according to claim 1 or 2, comprising means (4) for immobilizing said suspension (2) in rotation.

4. Mechanism according to claim 1 or 2, comprising a buffer (61) for supporting a seating part (13) mounted at the lower part of said mast.

* * * * *